United States Patent [19]
Goode

[11] 3,872,794
[45] Mar. 25, 1975

[54] VEHICLE STEERING SYSTEM
[75] Inventor: William P. Goode, Dallas, Tex.
[73] Assignee: LTV Aerospace Corporation, Dallas, Tex.
[22] Filed: Apr. 2, 1973
[21] Appl. No.: 347,104

[52] U.S. Cl. .................. 104/247, 280/99, 280/408, 280/444, 180/79 R
[51] Int. Cl. ............................................. B61f 9/00
[58] Field of Search ...... 104/243, 245, 247; 280/99, 280/90, 81 A, 408, 443, 444, 103; 180/79.2 R, 79

[56] References Cited
UNITED STATES PATENTS
| | | | |
|---|---|---|---|
| 2,180,257 | 11/1939 | Rollins | 280/443 |
| 2,763,493 | 9/1956 | Hutchinson | 280/408 |
| 3,077,165 | 2/1963 | Vittorelli | 104/247 |
| 3,180,280 | 4/1965 | Kuch et al. | 104/245 |

FOREIGN PATENTS OR APPLICATIONS
| | | | |
|---|---|---|---|
| 1,082,511 | 5/1960 | Germany | 104/243 |

Primary Examiner—Albert J. Makay
Assistant Examiner—Kenneth Noland
Attorney, Agent, or Firm—Walter J. Jagmin; H. C. Goldwire; James M. Cate

[57] ABSTRACT

A vehicle steering system for a vehicle movable over a roadway having side guide walls, having a roadway steering mechanism for each pair of transversely aligned wheels of the vehicle, each mechanism having a steering member or follower bar engageable at its opposite ends with the roadway guide walls and transversely movable relative to the vehicle for turning its associated pair of wheels in accordance with such relative transverse movement to hold the vehicle in proper alignment on the roadway during its movement thereover. The linkage of each roadway steering mechanism may also include a motion translating device to permit the vehicle to be moved with either end forward. The steering system includes a tow steering mechanism having a linkage connecting the rear and front pairs of wheels of the vehicle so that it may be towed when off the roadway over a planar surface with the rear wheels turning relative to the vehicle about vertical axes in direction opposite the directions of turning movement of the front wheels relative to the vehicle to shorten the possible radius of turn of the vehicle and minimize tire wear.

4 Claims, 4 Drawing Figures

VEHICLE STEERING SYSTEM

This invention relates to vehicles and more particularly to vehicle steering mechanisms.

Vehicles which are adapted to travel over a roadway having longitudinal side guide walls, flanges, or guide rails for guiding movement of the vehicles over the roadway, and which must also be capable of being towed when off the roadway over a planar surface, must have steering mechanisms for each mode of movement which are not mutually incompatible. Moreover it is preferable that the roadway steering mechanisms be adjustable to permit movement of the vehicle in either direction over the roadway so that each pair of wheels may at times be the front or the rear wheels of the vehicle.

Accordingly, it is an object of this invention to provide a new and improved steering system for a vehicle having front and rear individually steerable wheels.

Another object is to provide a steering system of the type described, wherein each pair of transversely aligned wheels has an individual roadway steering mechanism cooperable with longitudinal side guide walls, rails, or flanges of a roadway to turn the wheels as required to hold the wheels in proper transverse alignment with the roadway during the travel of the vehicle thereover.

Still another object is to provide a steering system, of the type described, each of whose roadway steering mechanisms includes a steering or control member movable transversely relative to the vehicle whose opposite ends are engageable with the roadway side guide walls and a linkage connecting the steering member to the king pins on which the wheels are mounted for causing the king pins to rotate and the wheels to turn in accordance with the relative transverse movement between the steering member and the vehicle.

A further object is to provide a steering system of the type described, wherein the linkage of each roadway steering mechanism includes a motion translating device for permitting reversal of the direction of turning of the pair of wheels caused by transverse motion of the steering member in a given direction whereby the steering mechanisms of the two pairs of wheels may be adjusted to permit movement of the vehicle in either direction over the roadway so that the front pair of wheels become the rear pair and vice versa.

An important object of the invention is to provide a vehicle steering system, of the type described, having a tow steering mechanism which functions when the vehicle is off the roadway, at which time its roadway steering mechanisms are ineffective, which does not interfere with the functioning of the roadway steering mechanisms when the vehicle is moving over the roadway.

Another object is to provide a vehicle steering system, of the type described, whose tow steering mechanism includes a linkage connecting the steering arm of the king pin of one of the wheels at one end of the vehicle with the steering arm of the king pin of one of the wheels at the other end of the vehicle to cause the wheels at one end of the vehicle to turn about essentially vertical axes relative to the vehicle in directions opposite to the direction of turning movement of the other wheels about vertical axes.

Still another object is to provide a tow steering mechanism, wherein the linkage of the tow steering mechanism includes an overload strut or device which, when the turning movements of one pair of wheels are resisted by an excessive force, functions to relieve the overload forces thus imposed on the tow steering mechanism as the other pair of wheels is turned so that the tow steering mechanism does not interfere with the roadway steering mechanism when the vehicle is on the roadway.

Another important object is to provide a new and improved overload device which has two sections or members which are movable longitudinally relative to each other, and whose relative movement in either direction is yieldably resisted by a single prestressed spring.

Still another object is to provide an overload device having a tubular housing, a plunger movable in the housing and a spring cooperative with the housing and the plunger yieldably resisting movement of the housing and the plunger relative to each other in either direction.

Other objects and advantages will be apparent from the specification and claims and from the accompanying drawing illustrative of the invention.

Figure 1:
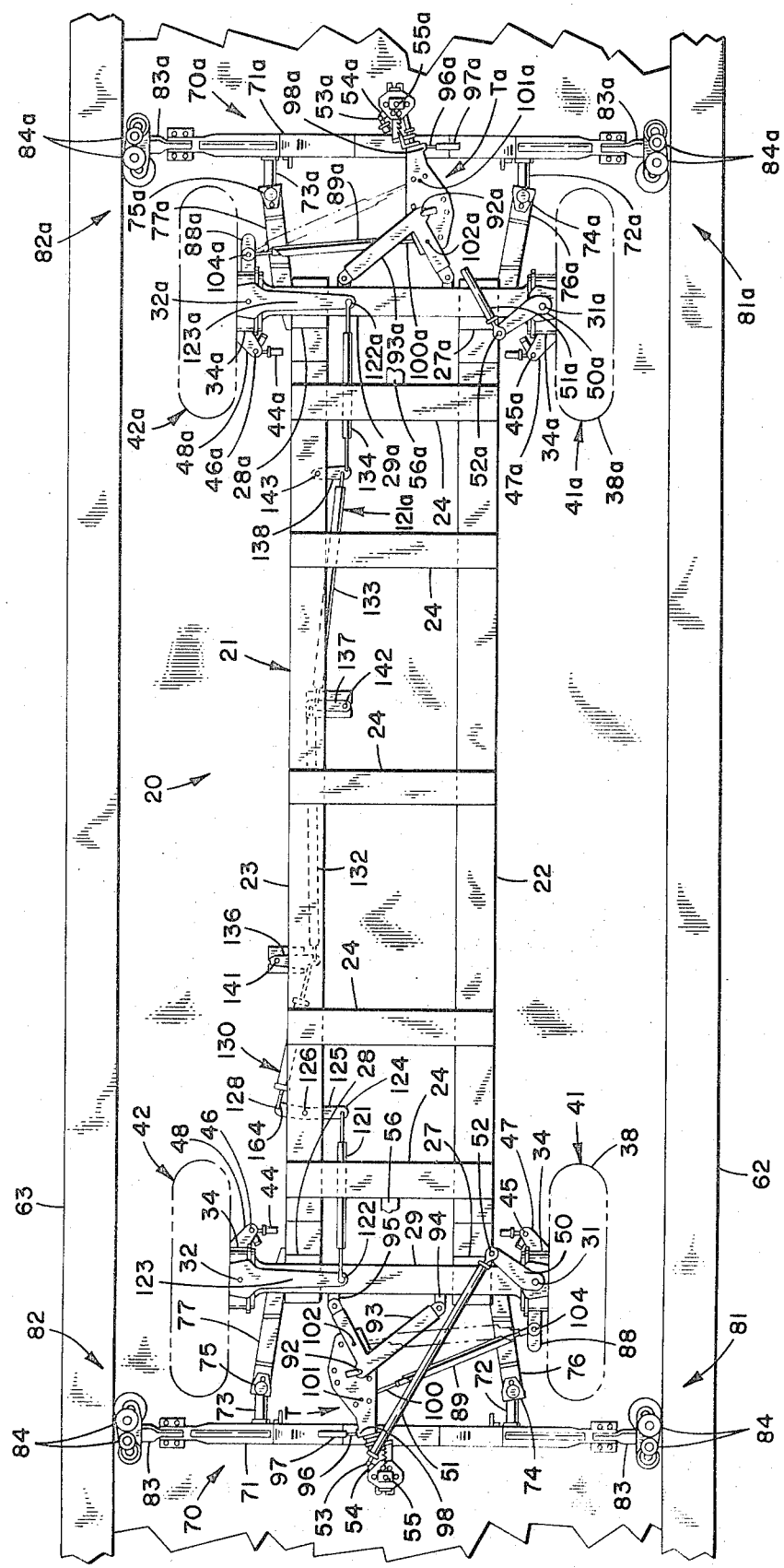
FIG. 1 is a top view, with some parts broken away, of the frame of a vehicle provided with a steering system embodying the invention.
Figure 2:
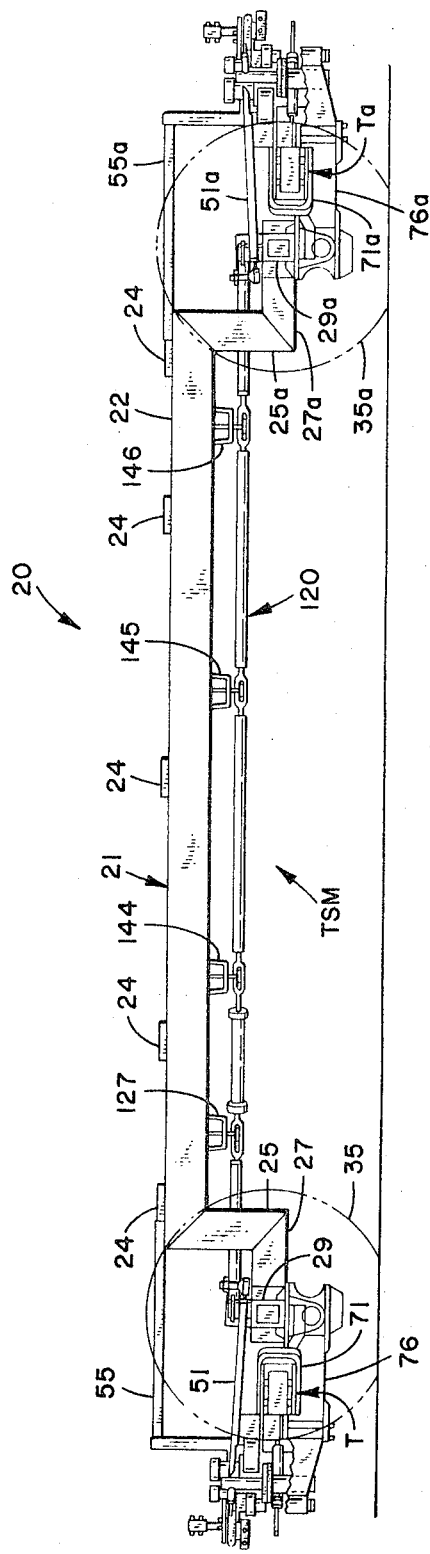
FIG. 2 is a side view, with some parts broken away, of the vehicle illustrated in FIG. 1.
Figure 3:
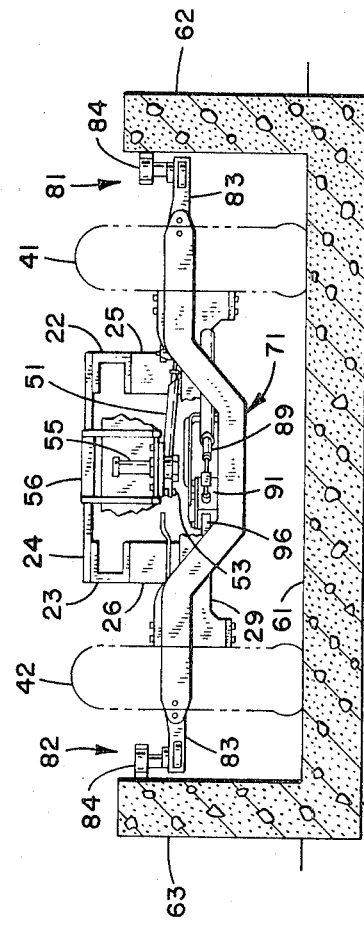
FIG. 3 is an end view, with some parts broken away, of the vehicle illustrated in FIG. 2.

Referring now to the drawings, the vehicle 20, which is shown provided with the steering system embodying the invention, includes a main frame 21 comprising a pair of parallel longitudinal side members 22 and 23 which are connected by a plurality of transverse members 24. The side members 22 and 23 at one end have dependent legs 25 and 26 provided at their lower ends with extensions 27 and 28 which are rigidly secured, in any suitable manner, to an axle 29. The axle at its opposite ends is provided with substantially vertical king pins 31 and 32 on whose horizontal spindles are rotatably mounted the usual hubs 34 to which the wheel 35 may be secured. The wheels are of course provided with resilient or pneumatic tires 38. Wheel assemblies 41 and 42, each formed of a wheel disk and a tire, are caused to turn simultaneously about the substantially vertical axes of their king pins 31 and 32, respectively, by a tie rod 44 whose opposite ends are pivotally connected, as at 45 and 46, to the arms 47 and 48 rigidly connected in the usual manner to the king pins 31 and 32, respectively, so as to comprise the well known "Ackerman Steering Linkage" which minimizes tire wear. As is known in the art, some Ackerman steering linkage also employ vertical spindles rotatable about fixed vertical king pins; in such systems, the arms 47 and 48 are rigidly connected to the rotatable vertical spindles, not shown, rotatable about vertical king pins 31 and 32, respectively.

The king pin 31 has an arm 50 rigidly secured to its top end. One end of a link 51 is pivotally connected, as at 52, to the king pin steering arm 50 and its other end is pivotally connected, as at 53, to a lever arm 54 rigid with a shaft 55 rotatably mounted, by suitable bearing means, on the forward end of a draw bar 56 which extends from an adjacent transverse member 24 of the frame 21. The towing bar of a towing vehicle is rigidly securable to the shaft 55 and therefore the shaft 55 will rotate with the towing vehicle tow bar as the towing vehicle turns relative to the vehicle 20 and will cause the linkage comprising the lever arm 54, the link 51 and the arm 50 to cause the king pin 31 to rotate in the direction of turning movement of the towing vehicle. Since the king pins 31 and 32 are connected by the rod 44, the tow wheels of the vehicle will then be turned about the axes of their king pins in the same direction as the turning movement of the towing vehicle.

The vehicle is specially adapted to be moved in a predetermined path over a roadway 60 which has a planar road surface 61 and side guide walls or flanges 62 and 63. The vehicle may be driven in any suitable manner over the roadway. For example, one or more of the wheels 41, 42, 41a and 42a may be driven by an electric motor or the vehicle may have mounted thereon the primaries of two linear induction motors along its sides in which case the secondaries of the motors would be mounted along the sides of the roadway 61.

During movement of the vehicle over the roadway, the wheels 41 and 42 are steered by a roadway steering mechanism 70 which includes a transverse follower bar 71 which has two arms 72 and 73 pivotally connected, as by shafts 74 and 75, to the other ends of brackets 76 and 77 whose inner ends are rigidly secured by any suitable means to the axle 29.

At its opposite ends, the follower bar is provided with wheel assemblies 81 and 82 each of which comprises a bracket 83 bolted to the end of the follower bar and a plurality of wheels 84 mounted on the bar for rotation about vertical axes. The wheels of the assembly 81 are engageable with the roadway wall 62 while the wheels of the assembly 82 are engageable with the roadway wall 63.

It will be apparent that the follower bar will move transversely relative to the frame of the vehicle in one direction or the other as either one set or the other of the guide wheels engages its associated roadway wall if the vehicle tends to move laterally toward such wall or if such wall curves, as at locations of changes of direction of the roadway.

The follower bar 71 of the steering mechanism 70 is connected to a steering arm 88 of the king pin 32 by a linkage 90 which includes a body 91 mounted intermediate its ends for pivotal movement, as at 92, and brackets 93 secured to the arms 94 and 95 rigid with the axle. The input member 96 of the translating device has one end rigidly secured to a bracket 97 rigid with the follower bar 71 and its other end is pivotally secured, as at 98, to the body 91. The output member 100 of the translating device has one end pivotally secured in either of two alternative positions, as at 101 and 102, to the body 91 while its other end is rigidly secured to one end of a link 89 whose other end is pivotally secured, as at 104 to the steering arm 88.

It will be seen that when the axis of pivotal connection of the output member is at the location 101 between the axes of pivotal connections of the input member 96 to the body 91 and of the body to the bracket 93, the output member will be moved in the same direction as the input member when a force exerted on the body by the input member causes the body to pivot. If, however, the axis of pivotal connection of the output member is at 102, the axis of pivotal connection of the body to the bracket 93 is located between the axes of pivotal connections of the input and output members to the body. As a result, the output member 100 will now be moved in the opposite direction to the direction of movement of the input member as the body is pivoted by a force applied thereto by the input member.

It will now be apparent that if the vehicle is moving to the left, as seen in FIG. 1, the wheels 41 and 42 must turn in a clockwise direction about the axes of their kingpins 31 and 32 if the vehicle approaches the left wall 62 in the direction of movement of the vehicle. When the vehicle tends to move to the right and the vehicle frame is moved laterally to the right relative to the follower bar due to the engagement of the wheel assembly 82 with the side wall 62 or as when the follower bar is moved transversely to the left of the vehicle frame at locations where the side guide walls curve to the left, the wheels 41, 42 must then pivot in a counterclockwise direction about the axes of their king pins. In this case the motion translating device T is placed in the full line position illustrated in FIG. 1 wherein the location of pivotal connection of the output member is at 101 so that the axis of pivotal connection of the output member with the body is located between the locations of pivotal connections of the body 91 with the input member 96 and the pivot 92. As a result, the output member 100, and therefore the link 89, will move laterally in the same direction as the follower bar when the follower bar is moved laterally.

If the vehicle is moving to the right, as seen in FIG. 1, so that the wheels 41 and 42 are now at the rear of the vehicle, and if the vehicle now tends to move laterally on the roadway, it is necessary that the direction of lateral movement of the output member 100 and link 89 relative to the vehicle be opposite to that of the follower bar. The axis of pivotal connection of the output member to the body 91 is therefore moved to the location 102 and the output member 100 and link 89 are then in the positions illustrated in broken lines in FIG. 1 with the axis of pivotal connection 92 of the body 91 being disposed between the axis of pivotal connection of the output member with the body 91 and the axis of pivotal connection of the body 91 with the input member 96. As a result, if the vehicle is now moving to the right, FIG. 1, and the vehicle tends to move laterally toward the wall 62, the follower bar 71, due to the engagement of its wheel assembly 82 with the side wall 62 will move to the left relative to the vehicle, and the wheels will be pivoted in counter-clockwise manner about the vertical axes of their king pins.

The wheels 41a and 42a at the other end of the vehicle frame are connected to one another, to the frame and the steering mechanism in the same manner as are connected the wheels 41 and 42 and, accordingly the various elements of the means associated with the wheels 41a and 42a have been provided with the same reference characters, to which the subscript a has been added, as the various elements of the means associated with the wheels 41 and 42.

It is desirable, when the vehicle is being towed, that the rear pair of wheels turn, but in the opposite direction, when the front wheels turn to facilitate turning movement of the vehicle, to permit operation in a narrower guideway, and minimize wear of the tires. A tow steering mechanism TSM is provided for this purpose and includes a linkage 120 having a link 121 pivotally connected at one end, as at 122, to the steering arm 123 of the king pin 32 and at its other end, as at 124, to one end of a reversing lever 125 which is pivotally connected as at 126 to the frame by means of a bracket 127 secured to the side frame. The other end of the reversing lever is pivotally connected, as at 128, to one end of an overload device 130. It will be apparent that since the axis of pivotal movement of the reversing lever is between the axes of pivotal connections of the reversing lever with the link 121 and the overload device, the overload device will be moved to the left when the link 121 is moved to the right and vice versa.

The other end of the overload device is connected to arm 123a of the king pin 32a by links 132, 133 and 134 and support levers 136, 137 and 138 which are pivotally connected at one end, as at 141, 142 and 143, respectively, to support brackets 144, 145 and 146, rigidly secured to and depending from the side frame member 23. The link 132 has its opposite ends pivotally connected to the support levers 136 and 137, the link 133 has its opposite ends pivotally connected to the levers 137 and 138, and the link 134 has one end pivotally connected to the support lever 138 and its other end to the steering arm 123a of the king pin 32a.

It will be apparent that when the king pin 32 is rotated in a clockwise direction, due to the provision of the reversing lever 125, the king pin 32a will be rotated in a counterclockwise direction and vice versa.

Figure 4:
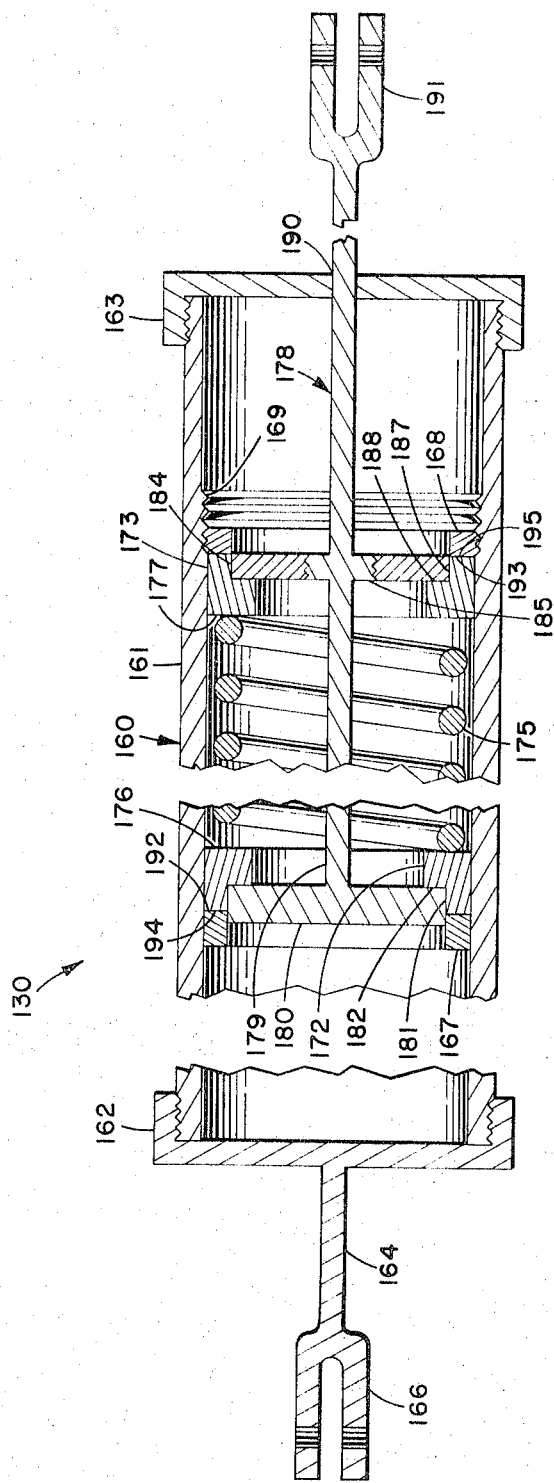
FIG. 4 is a sectional view of an overload device used in the steering system.

The overload device 130, FIG. 4, constitutes an element of the linkage 120 and is provided to protect the vehicle steering system against damage if for some reason the forces resisting turning movement of one pair or other of the wheels are excessive, as when one pair of wheels are in ruts which prevent turning movement. Another function of the overload device 130 is to allow the front and rear wheels to steer in a semi-independent manner, as is necessary if the vehicle is on a curving portion of the roadway so that its steering mechanism T or Ta, due to engagement of its follower bar 71 or 71a with a roadway side guide wall 62 or 63 turns one pair of wheels while the follower bar of the other steering mechanism due to its engagement with one of the side guide walls tends to resist turning movement of the other pair of wheels relative to the vehicle.

The overload device 130 includes a tubular housing 160 having a cylindrical middle section 161 on whose opposite ends are rigidly secured, as by threads, end closures or caps 162 and 163. The end cap 162 has a rod 164 rigidly secured thereto which has a clevis 166 which is pivotally secured to reversing lever 125.

An annular stop ring 167 is rigidly secured, as by welding, to the middle housing section at a location spaced from its left end. A similar stop ring 168 is threaded, as at 169, to the middle section. The stop ring has recesses in which prongs or lugs of a suitable installation tool may be inserted to facilitate rotation of the ring during its installation or removal from the middle section 161.

A pair of sleeves 172 or 173 are slidably disposed in the housing middle section and biased away from each other by a spring 175 whose opposite ends engage the facing annular end surfaces 176 and 177 of the sleeves 172 and 173, respectively.

A plunger 178 is telescoped in and longitudinally movable relative to the housing and includes a longitudinal rod 179 having a circular end or stop member 180 rigidly secured thereto or integral therewith. The peripheral portions of the stop member are received in an annular end recess of the sleeve 172 defined by the annular surfaces 181 and 182.

A second annular stop member 184 is threaded on an external annular flange 185 of the rod 179 and its peripheral portions are received in an annular recess of the sleeve 173 defined by the annular surfaces 187 and 188. The rod 179 extends slidably through an aperture 190 of the end cap 163 and has a clevis 191 which is pivotally attached to the support lever 136.

During the assembly of the overload device, the sleeve is first telescoped over the rod 179 until the stop member 180 moves into engagement with the surfaces 181 and 182 of the sleeve. The spring 175 and then the sleeve 173 and stop member 184 are telescoped thereover. The spring is compressed to a desired preload as the stop member 184 is threaded on the external flange 185 of the rod. The stop member 168 is then threaded in the middle housing section 161 until the end surfaces 192 and 193 of the stop members 167 and 168 abut the end surfaces 194 and 195, respectively, of the sleeves 172 and 173. The cap 163 is then positioned on the rod and threaded on the right end of the housing middle section 161.

Since the spring is now prestressed, it will resist longitudinal movement of the housing and plunger relative to each other until the force tending to move the plunger and housing either toward or away from each other exceeds a value predetermined by the strength of the spring 175 and the degrees of its prestress or compression.

For example, if a force is exerted on the housing tending to move it to the left while the plunger is being held against such movement, a force tending to compress the spring is exerted through the stop member 168 and the sleeve 173 and through the spring and the sleeve 172 and the plunger stop member 180. If such force exceeds a predetermined value, the spring compresses and permits movement of the housing to the left, relative to the plunger.

Conversely, if a force is exerted on the plunger 179 tending to move it to the left while the housing is held against movement, the springs force exerted through the sleeve 173 on the plunger stop member 184 prevents such movement of the plunger until such force exceeds the predetermined value necessary to cause compression of the spring.

It will thus be seen that a single spring 175 in coaction with the sleeves and the stop members of the housing middle section and the plunger is effective to resist telescoping movement of the plunger in either direction in the housing.

It will also be seen that since the plunger stop members are received in oppositely facing annular end recesses of the sleeves, the plunger is held in properly aligned concentric relation to the housing.

It will now be seen that a new and improved vehicle steering system has been illustrated and described which includes separate roadway steering mechanisms 70 and 70a for the pairs of end wheels of the vehicle, which function when the vehicle is moving over a roadway having side guide rails, and a tow steering mechanism which functions when the vehicle is being towed by means of a tow bar rigidly secured either to its tow shaft 55 on one end of the vehicle or its tow shaft 55a on its other end.

It will further be seen that the vehicle may be moved in either longitudinal direction over the roadway, the motion translating devices T and Ta, which per se are not a part of the present invention, being adjustable to cause proper turning of the wheels to permit such travel in either longitudinal direction.

What is claimed is:

1. A steering system for a vehicle movable over a roadway having longitudinal side guide surfaces, the vehicle having a frame and pairs of transversely aligned wheels mounted on king pins connected to the frame and rotatable about substantially vertical axes, the king pins of each pair of transversely aligned wheels being connected for simultaneous turning movement about the axes of their king pins, at least one of the king pins of each pair of wheels having a steering arm extending therefrom, said steering system including:

a separate roadway steering mechanism for each pair of wheels, each said roadway steering mechanism including:

a steering member mounted on a portion of the vehicle for movement relative thereto and engageable with the side guide surfaces of the roadway, a linkage connecting said steering arm of the king pin of one of the pair of wheels whose turning movements are controllable by said steering member for causing said pair of wheels to turn about said axes in accordance with the movement of said steering member relative to the vehicle frame upon engagement of said steering member with the side guide surfaces, the steering system including a tow steering mechanism for controlling the turning movement of the wheels when the vehicle is moving over a surface other than that provided by the roadway, said tow steering mechanism including:

a tow member at the end of the frame connectible to a towing means;

a linkage connecting said tow member to one of the king pins of the pair of wheels adjacent said one and for causing turning movement of the king pins of the wheels in accordance with the turning movement of the towing means; and a second linkage connecting the king pin on one of the wheels of the pair of wheels with the king pin of one of the wheels of the other pair of wheels for causing said other pair of wheels to turn relative to the frame in a direction opposite to the direction of turning movement of said one pair of wheels relative to the frame.

2. The steering system of claim 1, wherein said second linkage includes an overload device whose length varies in accordance with the direction of the longitudinal force exerted thereon when said force exceeds a predetermined value if the force resisting turning movement of said pair of wheels in either direction exceeds a predetermined value.

3. The steering system of claim 2, wherein said overload device constitutes a longitudinal link of said linkage and includes an elongate housing having a pair of longitudinally spaced internal stop means and a plunger longitudinally movable in said housing and said plunger having a pair of longitudinally spaced external stop members, a pair of movable members movable longitudinally in said housing and disposed between said stop means; and resilient means between said slidable member yieldably biasing said slidable members in opposite directions with a predetermined force against said stop means, said movable members being disposed between said plunger stop members and engageable thereby whereby movement of said plunger and said housing relative to one another in either longitudinal direction is prevented by said resilient means until the force tending to move said housing and said plunger longitudinally relative to one another exceeds a predetermined value.

4. The steering system of claim 3, wherein one of said stop members is adjustable relative to the other of said stop members for adjusting the force exerted by said resilient means and said slidable members, said housing and said plunger having means remote from one another for connecting them to spaced movable elements of said second linkage.

* * * * *